United States Patent
Krepec (10) Patent No.: US 7,969,409 B2
(45) Date of Patent: Jun. 28, 2011

(54) CAMERA ASSISTED PEN TABLET

(76) Inventor: Rafal Jan Krepec, Brossard (CA)

( * ) Notice: Subject to any disclaimer, the term of this patent is extended or adjusted under 35 U.S.C. 154(b) by 873 days.

(21) Appl. No.: 11/133,141

(22) Filed: May 19, 2005

(65) Prior Publication Data

US 2007/0024590 A1    Feb. 1, 2007

Related U.S. Application Data (63) Continuation of application No. 11/060,049, filed on Feb. 17, 2005, now abandoned.

(60) Provisional application No. 60/545,275, filed on Feb. 18, 2004.

(51) Int. Cl.
 *G09G 5/00*    (2006.01)
(52) U.S. Cl. .................................. 345/156; 345/173
(58) Field of Classification Search .......... 345/156–172, 345/418–475; 705/1–45; 725/37–61; 700/715
 See application file for complete search history.

(56) References Cited

U.S. PATENT DOCUMENTS

| | | | | |
|---|---|---|---|---|
| 5,311,207 A | * | 5/1994 | Kusumoto et al. | 345/601 |
| 5,511,148 A | * | 4/1996 | Wellner | 358/1.6 |
| 5,594,469 A | * | 1/1997 | Freeman et al. | 345/158 |
| 5,680,636 A | * | 10/1997 | Levine et al. | 715/201 |
| 5,736,687 A | * | 4/1998 | Sellers | 178/18.03 |
| 6,043,805 A | * | 3/2000 | Hsieh | 345/158 |
| 6,600,475 B2 | * | 7/2003 | Gutta et al. | 345/156 |
| 6,930,685 B1 | * | 8/2005 | Sakagawa et al. | 345/426 |
| 7,176,881 B2 | * | 2/2007 | Nishimura et al. | 345/156 |
| 7,176,890 B2 | * | 2/2007 | Kitaguchi et al. | 345/158 |
| 2002/0140667 A1 | * | 10/2002 | Horiki | 345/156 |
| 2004/0032398 A1 | * | 2/2004 | Ariel et al. | 345/168 |
| 2004/0095318 A1 | * | 5/2004 | Morrison et al. | 345/158 |

* cited by examiner

*Primary Examiner* — Kevin M Nguyen
*Assistant Examiner* — Kenneth B Lee, Jr.

(57) ABSTRACT

An x-y user input device, such as a pen tablet or digitizing tablet, used to control a cursor on a display of a data processing system, comprises an imaging device or camera and an image processor for displaying a captured image of a user's hand operating the input device within a window of the display. The input device is generally operated using a pointing device that controls the cursor position on the display while being synchronously imaged and displayed with the user's hand on the display. The position of the captured image of the user's hand and pointing device in the window relative to the cursor corresponds to a position of the hand relative to the pointing device, thereby providing a visualization effect that increases user comfort and proficiency with the input device.

44 Claims, 8 Drawing Sheets

FIG_3A

FIG_3B

FIG_7A

FIG_7B

CAMERA ASSISTED PEN TABLET

CROSS REFERENCE TO RELATED APPLICATIONS

This application is a continuation of prior application Ser. No. 11/060,049, filed Feb. 17, 2005, which claims the benefit of U.S. Provisional Application No. 60/545,275, filed Feb. 18, 2004. The text of these applications are incorporated into the present application by reference.

FIELD OF THE INVENTION

The present invention relates to a camera assisted pen tablet. In particular, the present invention relates to a camera assisted tablet wherein an image of a user's hand and pointing device interacting with the tablet is overlaid on the display graphics to improve user comfort and proficiency using the tablet.

BACKGROUND OF THE INVENTION

User input devices used for interfacing with an electronic data processing system or computing device take many forms including keyboards, mice, track balls, etc. Of particular interest in this disclosure are the various x-y input devices, commonly known as tablets, digitizing tablets or pen tablets. These tablets, which may be activated by touch, proximity or other such means using a finger, a stylus or even a mouse, are used to control the position and movement of a cursor on the display of a computing device, and for communicating and implementing various software and system commands, functions and features.

In general, a penlike pointing device is used with the tablet to provide pen-like control of the onscreen cursor. Such pointing devices also provide the same features and functions of a mouse by using either buttons on the pointing device itself, or by 'clicking' the pointing device tip on the tablet (e.g. tip contact with a proximity-activated tablet or tip tapping with a touch activated tablet reproduces 'clicking' functions of a mouse). Furthermore, the boundaries of the active surface of the tablet generally correspond to the boundaries of the display such that the user may instinctively position the cursor on the display using the tablet boundaries as reference. Uses for these devices include for example point-and-click functions common with a mouse, drawing and image modification functions in various software, signature digitization, as well as other functions where the use of a pen-like object for interfacing with a computing device is beneficial or preferential over the use of a standard mouse and/or keyboard.

One particular drawback of these devices is that the user of a tablet must focus on the display screen of the computing device while somewhat blindly manoeuvring the stylus or pointing device on the tablet at its side. Unlike using a pen on a piece of paper, the eyes of a tablet user are focused on the display screen and away from the physical "pen and paper", thereby reducing user dexterity and proficiency. Furthermore, as the user lifts his/her hand and pointing device from the tablet, the cursor can no longer be controlled by the pointing device until the pointing device is returned to the tablet, or close thereto. Lateral displacement of the hand and pointing device at a vertical distance from the tablet exceeding a certain tablet sensitivity threshold can thus not be followed and visualized on the screen.

The present invention, described herein and with reference to the appended illustrative drawings, provides a camera assisted tablet, and alternative embodiments thereof, that overcome the above and other drawbacks of prior art systems.

SUMMARY OF THE INVENTION

More specifically, in accordance with the present invention, there is provided a method for displaying a user's hand operating a pointing device controlling a cursor within a window of a display, the method comprising the steps of:
A) providing a substantially flat region on a surface, the region comprising dimensions proportionally the same as the window;
B) capturing an image of the hand operating the pointing device within the region; and
C) displaying the captured image in the window, a position of the captured image in the window relative to the cursor corresponding to a position of the hand relative to the pointing device.

Further in accordance with the present invention, there is provided a user input device for displaying a user's hand operating a pointing device controlling a cursor within a window of a display of a data processing system, the device comprising a substantially flat region on a surface, the region comprising dimensions proportionally the same as the window, an imaging device for capturing an image of the hand operating a pointing device within the region and an image processor for displaying the captured image in the window. A position of the captured image in the window relative to the cursor corresponds to a position of the hand relative to the pointing device Other objects, advantages and features of the present invention will become more apparent upon reading of the following nonrestrictive description of illustrative embodiments thereof, given by way of example only with reference to the accompanying drawings.

BRIEF DESCRIPTION OF THE DRAWINGS

Having thus generally described the nature of the invention, reference will now be made to the accompanying drawings, showing by way of illustration, illustrative embodiments thereof, and in which.

DETAILED DESCRIPTION OF THE ILLUSTRATIVE EMBODIMENTS

Figure 1A:
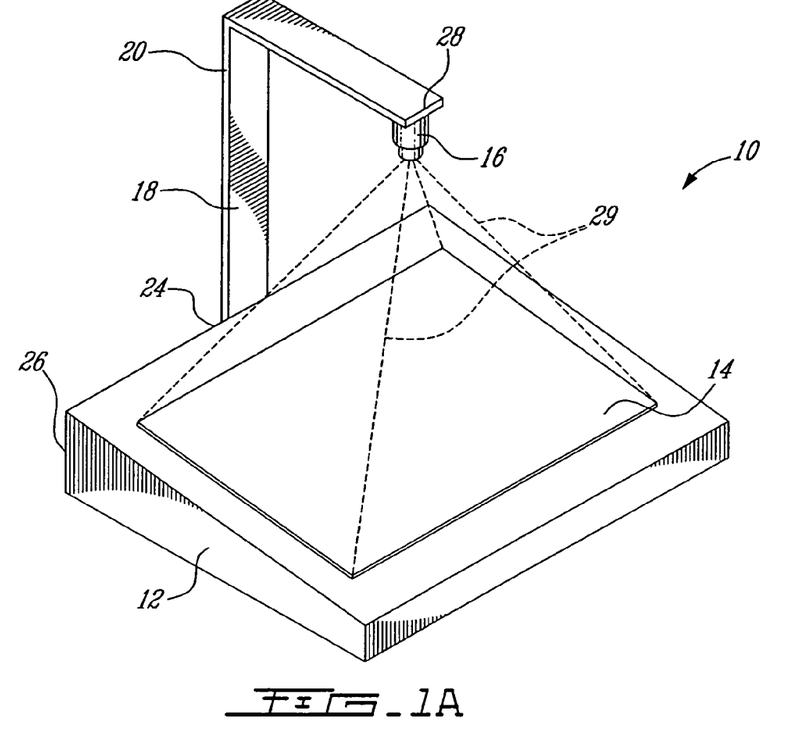
FIG. 1A provides a perspective view of a camera assisted tablet in accordance with an illustrative embodiment of the present invention.
Figure 1B:
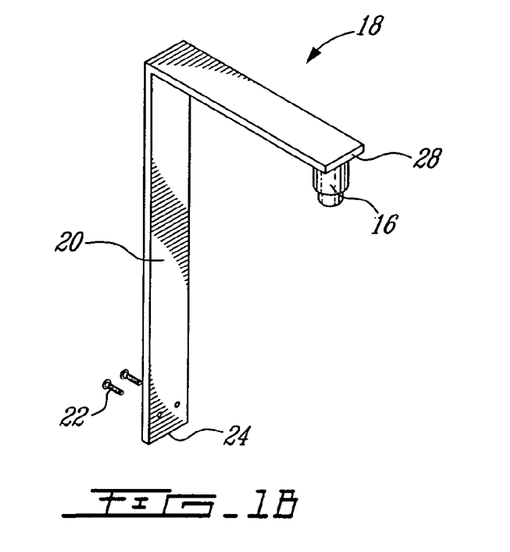
FIG. 1B provides an exploded perspective view of the camera and mounting arm therefore of FIG. 1A.

Referring to FIG. 1A, a camera assisted tablet, generally referred to using the reference numeral 10 and in accordance with an illustrative embodiment of the present invention, will now be presented. Generally, the camera assisted tablet 10 is comprised of a tablet 12 comprising an active surface 14, a camera 16 and a support arm therefore 18. With reference to FIG. 1B, the support arm 18 is illustratively comprised of an L-shaped support 20 for extending the camera 16 above the active surface 14 of tablet 12. A set of screws or bolts 22 solidly fasten the bottom end 24 of support arm 18 to the back face 26 of the tablet 12. The camera 16, coupled to the upper extremity 28 of support arm 18, is centered above the active surface 14 and is pointed vertically downward to capture images thereof. The active surface 14 generally corresponds to the camera scan area 29. Other such support mechanisms, whether malleable, adjustable or rigidly confined may replace the illustrated support arm 18 to provide a like effect. Furthermore, though the illustrative embodiment of FIG. 1 describes the use of a camera 16, which may include any type of digital or analog, photographic or video camera, other imaging devices and techniques, as described further hereinbelow, may be used to produce like effects.

Figure 2:
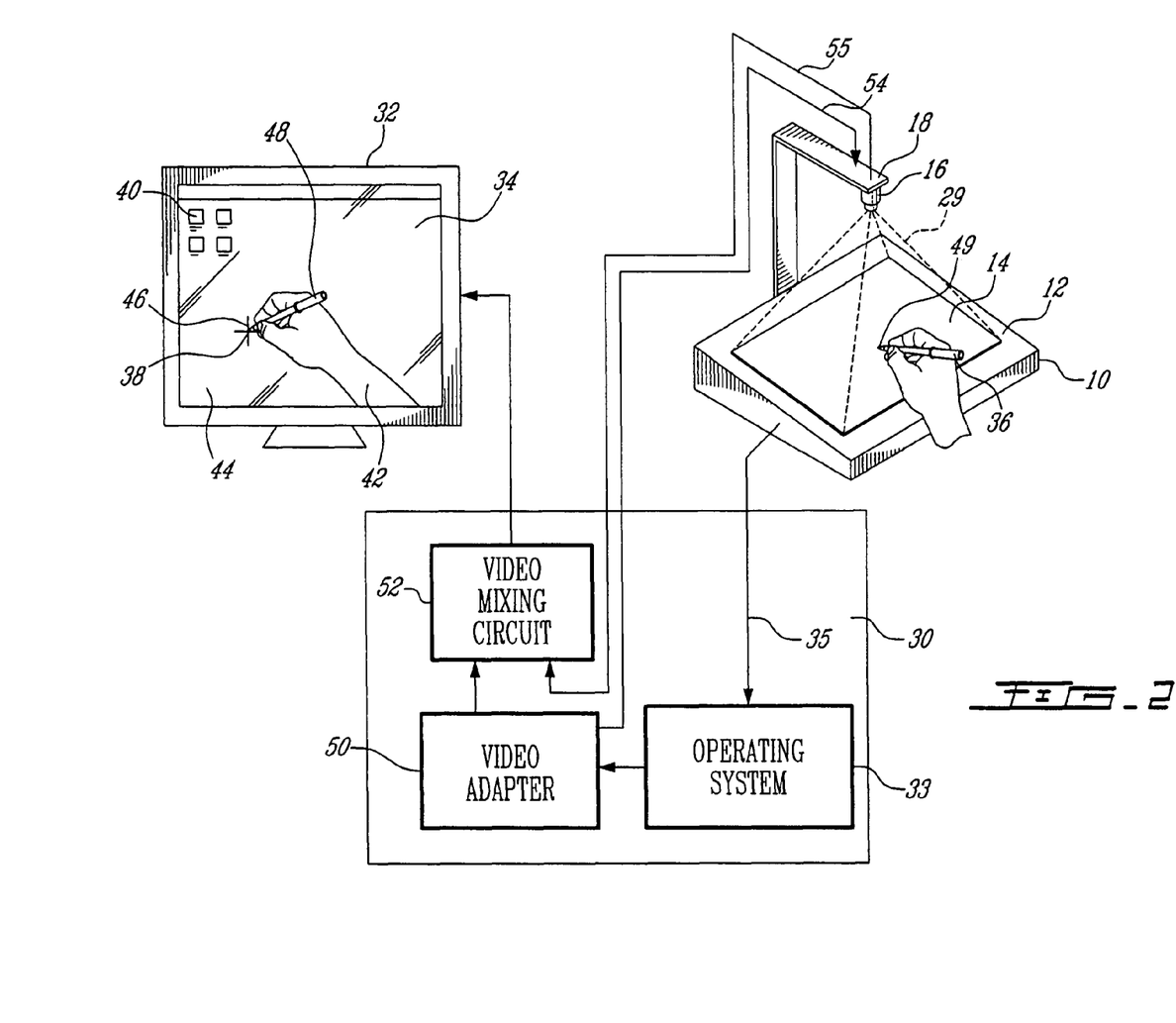
FIG. 2 provides a schematic diagram of the functions of the camera assisted tablet of FIG. 1A when used as an input device for a data processing system having a display in accordance with an illustrative embodiment of the present invention.

Referring now to FIG. 2, the camera assisted tablet 10 is generally used as an x-y user input device for use with a data processing system or computing device as in 30 comprising a display 32 and display screen 34. The display screen 34 may be of various types, including but not limited to, CRT screens, LCD screens, projection screens, plasma screens and other such screen types common with computer systems, televisions, and various other interactive devices such as ATMs, automatic ticketing devices and the like. The active surface 14 of the tablet 12 provides a user interface, in conjunction with the display 32, to the operating system 33 and software implemented thereon, of the computing device 30. Generally, the tablet 12 is connected to the computing device 30 through a wired or wireless link 35, which may include an infrared, RF, or optical link, or other such links common to wired and wireless device connections.

Furthermore, in order to enhance the use of the x-y user input device 10, the active surface 14 of the tablet 12 comprises dimensions that are generally proportionally the same as the display screen 34. In other words, an oval screen 34 would generally be coupled with an oval active surface 14, and a rectangular screen 34 with a rectangular surface 14, such that a user may use as reference the borders of the active surface 14 to guide the cursor 38 near the borders of the screen 34. Generally, the active surface 14 and screen 34 need not be of a same size, as they rarely are in prior art x-y user input devices, but they should share similar and generally proportional shapes.

Still referring to FIG. 2, the user interacts with the computer's operating system 33 and software implemented thereon using a pointing device 36. Pointing devices as in 36 may include, but are not limited to, a light pen, a stylus, a mouse, or even a user finger, and are used to activate point, drag, and/or click functions on the display 32. (Note that for simplicity, the term pointing device will hereinafter be used in the text of the specification, as well as in the claims appended herein, to represent any pointing device or user body appendage used to interact with the tablet, such as, but not limited to, those listed hereinabove). For example, the user may use the pointing device 36 like a standard mouse to move cursor 38 about the screen 34 to access various operating system or software functions or icons as in 40. In addition, the user may use pointing device 36 to operate various functions within a text processing software, a drawing software, an image manipulation and alteration software, or other such software where the use of a pen-like pointing device as in 36 may be beneficial or preferential over the use of a standard mouse. Other uses may include, but are not limited to, signature digitization procedures for security access authorization or authentication, or again document review and annotation functions in a document presentation software.

In the illustrative embodiment of FIG. 2, the camera assisted tablet 10 provides a visualization feature that improves the workability of the tablet 12. Generally, the camera assisted tablet 10 provides a system that allows visualization of the user hand and pointing device 36 directly on the display screen 34, thereby greatly improving the feel and comfort of using the tablet 12. In practice, this visualization feature allows to better reproduce the sensation of writing, drawing and/or manipulating displayed objects, menus and icons directly on the screen. As illustratively portrayed in FIG. 2, the user sees a synchronized real-time image 42 of his/her hand articulating the pointing device 36 overlaying the graphics 44 of the display screen 34. Furthermore, by proper alignment of the camera or imaging device (as described further hereinbelow), the image 42 will be overlaid such that the imaged tip 46 of the imaged pointing device 48 is properly aligned with the cursor 38 controlled by the tip 49 of the pointing device 36 on the active surface 14. Consequently, the cursor 38 may be completely removed, thereby enhancing the visualization of direct display interfacing using the imaged pointing device 48 in its stead. As will be discussed further hereinbelow with reference to FIGS. 7A, 7B, 8A and 8B, the visualization feature provided by the camera assisted tablet 10 may also be configured to operate within a selected set or subset of display windows and frames. Such visualization options will help the user optimize his/her use of the camera assisted tablet 10.

Still referring to FIG. 2, and in accordance with an illustrative embodiment of the present invention, the computing device 30 generally comprises an operating system 33, a video adapter 50 and a video mixing circuit 52 for image processing. Other hardware and software components may also be included in the computing device 30 to provide other functions, options and services that may or may not partake in the image transfer and processing mechanism described hereinbelow. The operating system 33, a software that generally controls the execution of programs and that may provide services such as resource allocation, input/output control, and data management, is used in this illustrative embodiment to receive user inputs from the tablet 12. The inputs are transferred to the video adapter 50 and subsequently through the video mixing circuit 52 for display on the display screen 34. The video adapter 50, which provides and controls the display graphics provided by the operating system 33 to be displayed on the screen 34, also provides a frame synchronization signal 54 to the camera 16, to synchronize graphics and camera video inputs. Consequently, the video camera 16 and the video adapter 50 will illustratively have identical horizontal, vertical and blanking signal timings, which optimizes video input compatibility and combinability. Finally, the video mixing circuit 52, which may also be replaced by a video mixing software or a combination of mixing hardware and software, receives video input from the camera 16 through link 55 for selective combination with the synchronized display graphics provided by the video adapter 50.

As described hereinabove, the tablet 12 is linked to the computer operating system 33 for transfer of user inputs. This link generally communicates the user actions, such as click, drag and point actions, both for display cursor manipulation (if a cursor 38 is selected to be displayed) and for various software implemented user actions and commands (select icon or object, scroll menu, write or draw, etc). The various functions implemented by pointing device 36 on the tablet 12 are subsequently rendered by the video adapter 50 and displayed on the display screen 34. Simultaneously, the camera 16 (or imaging device as described further hereinbelow) captures images of the user's hand articulating the pointing device 36 on the active surface 14 of the tablet 12 and sends them via 55 to the video mixing circuit 52, for synchronous display on the screen 34.

As will be further described hereinbelow, though the illustrated embodiment presents a video mixing circuit 52 for video input combination, a video mixing software could also be used to produce a like effect, as could other image transfer and processing mechanisms of the like. Furthermore, the various software and hardware components described hereinabove may be implemented within an external processor, as well as directly within the tablet 12 or again as part of an integrated processor within the display 32. A person of ordinary skill in the art will now understand that the illustrated embodiment of FIG. 2 presents only an example of how to implement the above, and that various other methods may be used to obtain a similar result without departing from the general scope and nature of the present disclosure.

Figure 3A:
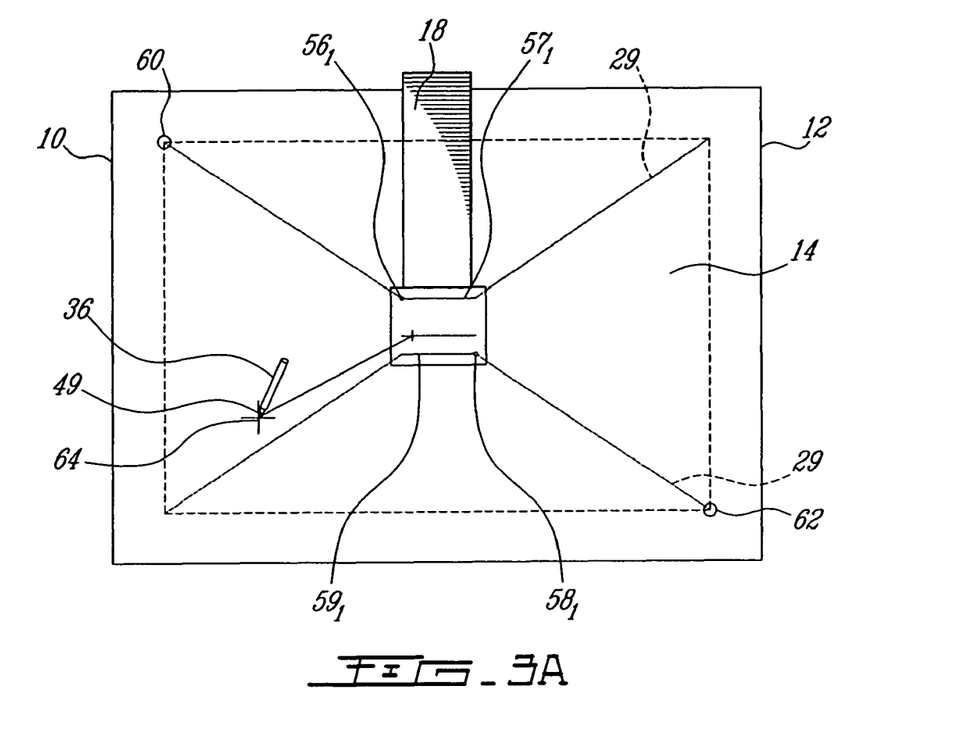
FIGS. 3A and 3B illustrate image frame synchronization between a camera assisted tablet, a camera and a display screen in accordance with an illustrative embodiment of the present invention.
Figure 3B:
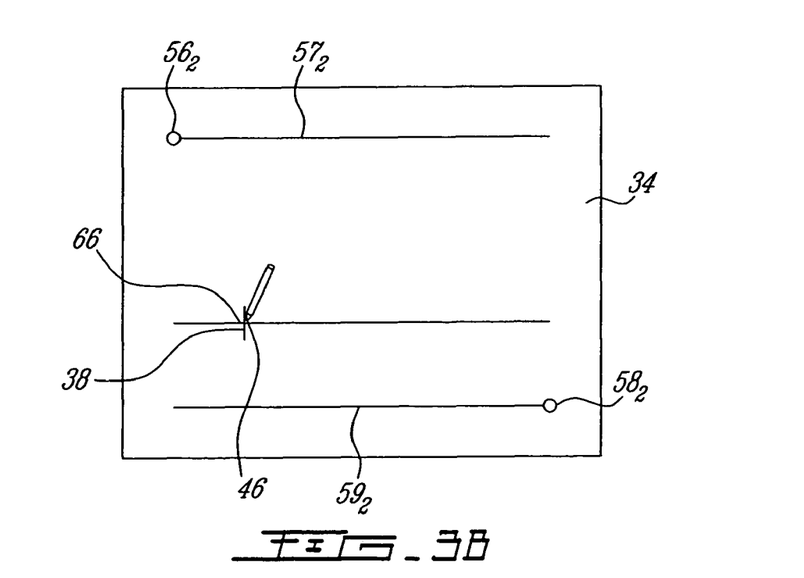

In order to provide for an optimised image transfer mechanism, the images gathered by the camera 16, as well as the positioning of points on the active surface 14 of the tablet 12, must be adequately aligned and formatted to correspond to the boundaries and proportions of the display screen 34. Consequently, referring now to FIGS. 3A and 3B in addition to FIG. 2, the camera 16 and computer video adapter 50 should be cooperatively configured. As already mentioned hereinabove, the camera 16 and video adapter 50 are frame synchronized such that they both share the same horizontal, vertical and blanking timings (Note that synchronized timings should be configured and adaptable for devices of different resolutions). Illustratively, a first pixel $56_1$ of a first scan line $57_1$ and a last pixel $58_1$ of a last scan line $59_1$ of the camera 16 should correspond with a first pixel $56_2$ of a first scan line $57_2$ and a last pixel $58_2$ of a last scan line $59_2$ of the display screen 34. Furthermore, the camera scan area 29 delimited by the above-listed pixels and scan lines should correspond with the active surface 14 of the tablet 12. Finally, a user input in the top left corner 60 of the active surface 14 should correspond to, and be imaged by, the first pixels 56 of the display screen 34 and camera 16, whereas a user input in the bottom right corner 62 of the active surface 14 should correspond to, and be imaged by, the last pixels 58 of the display screen 34 and camera 16. Necessarily, resolutions may not be identical for all devices, requiring appropriate resolution conversion algorithms to combine data from the various devices. Yet, the principle remains the same; in order to ensure that the position 64 of the tip 49 of the pointing device 36, the position 66 of the cursor 38 on the screen 34 controlled by same, and the imaged tip 46 of the imaged pointing device 48 all coincide with one another, the camera 16, the tablet 12 and the display 32 must all be adequately aligned and configured. In other words, the x-y input on the tablet 12 must correspond to an appropriate x-y position on the screen 34 and be imaged by a corresponding x-y coordinate in the imaging system and image transfer and processing mechanism.

In order to provide such alignment, the camera 16 may be adjusted manually, optically or electronically until the camera frame coincides with the boundaries of the active surface 14, which generally correspond to the boundaries of the screen 34. Alternatively, the adjustment and alignment may be accomplished using a software designed for this purpose. Such a software could also provide distortion settings to accommodate various camera positions and imaging angles. Ultimately, a user could calibrate the system in a first instance, whether manually or using a software, to reflect his/her configuration preferences, with the possibility of changing the setup and recalibrating the system when needed or desired.

Referring now to FIGS. 4A to 4D, and in accordance with an illustrative embodiment of the present invention, an image transfer and processing mechanism for isolating the camera images of the user's hand and pointing device 36 from the tablet background, and for combining these images with computer graphics will be presented. In practise, various methods may be used to isolate a desired component of an image for subsequent transfer or overlay. Namely, numerous methods in the film and photo industry are designed to provide such results. One of the possibly simplest methods involves capturing the desired images in front of a uniform screen and subsequently removing the uniform background from the combined image. This type of method works particularly well in this situation. For example, the active surface 14 of the tablet 12 could be of a dark uniform color, namely of a dark black or grey colour common with prior art tablets, and provide a background component to the captured images. The user's hand, articulating a pointing device of a bright and contrasting colour, defines the user component of the captured images that can be isolated by the video mixing circuit 52 or software for screen graphics overlay. Necessarily, other colour schemes may be implemented, but the background colour should be selected to substantially contrast with the colour of the pointing device, and also, with standard user skin tones. Alternatively, a user could wear a coloured glove to enhance the colour contrast. A patterned active surface 14 could also be used with an appropriate image isolation circuit or software.

Figure 4:
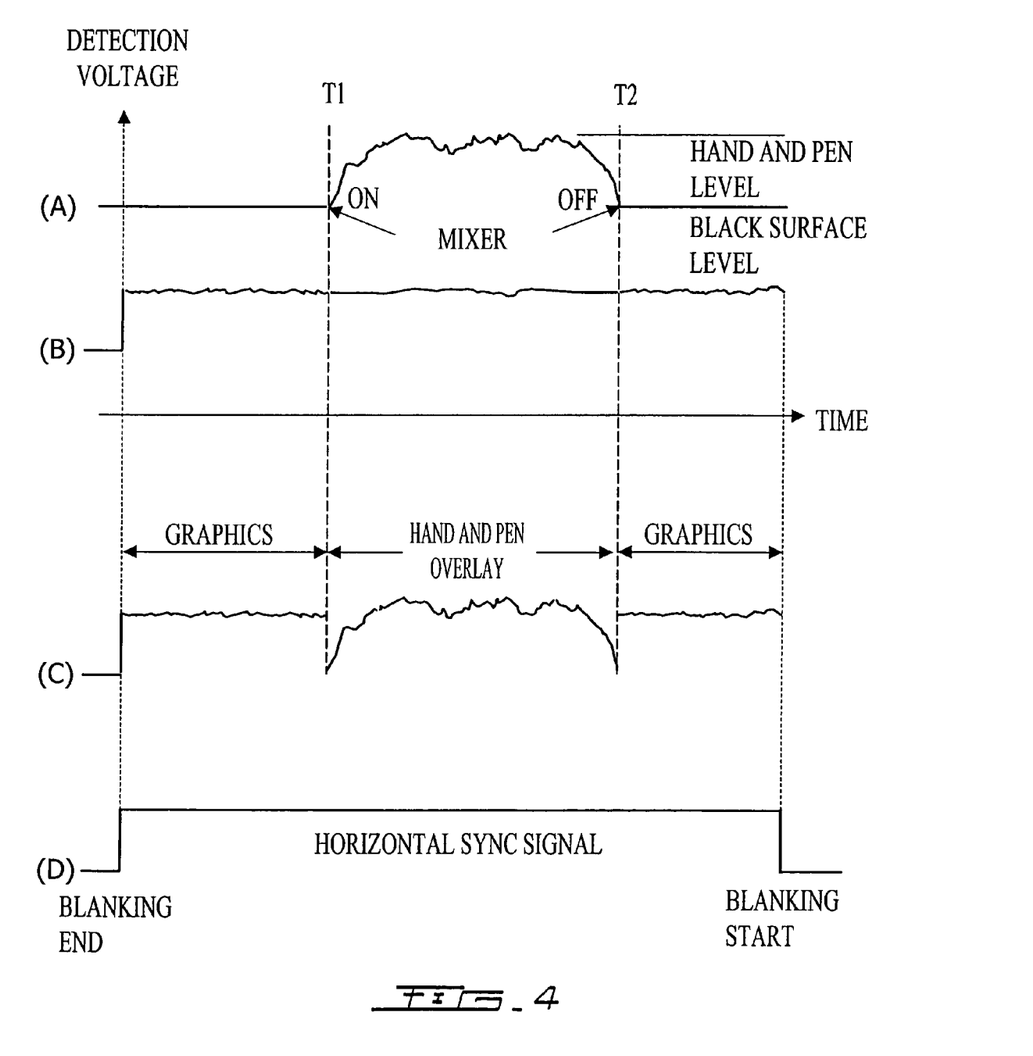
FIGS. 4A, 4B, 4C and 4D graphically illustrate an image isolation and combination technique in accordance with an illustrative embodiment of the present invention.

In FIG. 4A, a sample camera horizontal scan line detection voltage is presented as a function of scan time. The scan line generally represents a horizontal scan line halfway down the vertical sync signal representing the hand and pen positioned approximately in the middle of the active surface 14 as shown in FIG. 2. As mentioned hereinabove, the scan time of the camera is synchronized with the scan time of the display by the video adapter 50 such that an alignment between the camera image and the display graphics may be optimized. As a consequence, the video signal of FIG. 4A and the graphics signal of FIG. 4B (discussed further hereinbelow) share a substantially identical horizontal sync signal (FIG. 4D) as well as substantially identical blanking timings. In the illustrated example of FIG. 4A, the first segment of the camera voltage readings coincides with the black surface level (background level). At time T1, the signal increases indicating the imaging of brighter objects, namely a user's hand and pointing device; the mixer switches to the camera signal. At time T2, the signal returns to the black level, the mixer switches back to the graphics signal and remains to the end of the scan line.

In FIG. 4B, a sample display graphics signal is presented, running continuously for the whole scan line.

In FIG. 4C, the graphics and camera image are combined. From start to T1, the camera image of the background is cropped and the graphics remain. From T1 to T2, the mixer cuts out the graphics signal and retains the image signal. Finally at T2, the graphics signal is regained as the image signal returns to black.

FIG. 4D illustrates the horizontal sync signal and blanking timings.

As can be seen from the above illustration, by synchronizing the scan lines of the display 32 and camera 16, the hand and pointing device image 42 can be overlaid on the screen graphics 44 of the screen 34. Using this method, the user may also select to project a translucent image 42 of the hand and pointing device. For example, by mixing every odd, even or $n^{th}$ scan line, the display graphics 44 will still appear underneath the semi-transparent hand and pointing device image 42. Alternatively, a high frequency mixer switch (e.g. a frequency proportional to the graphics signal pixel clock) between the camera and graphics signals may be implemented during the image mixing period from T1 to T2, thereby producing a like effect. Transparency features of this type could be activated by the user using a physical or software switch.

Figure 5:
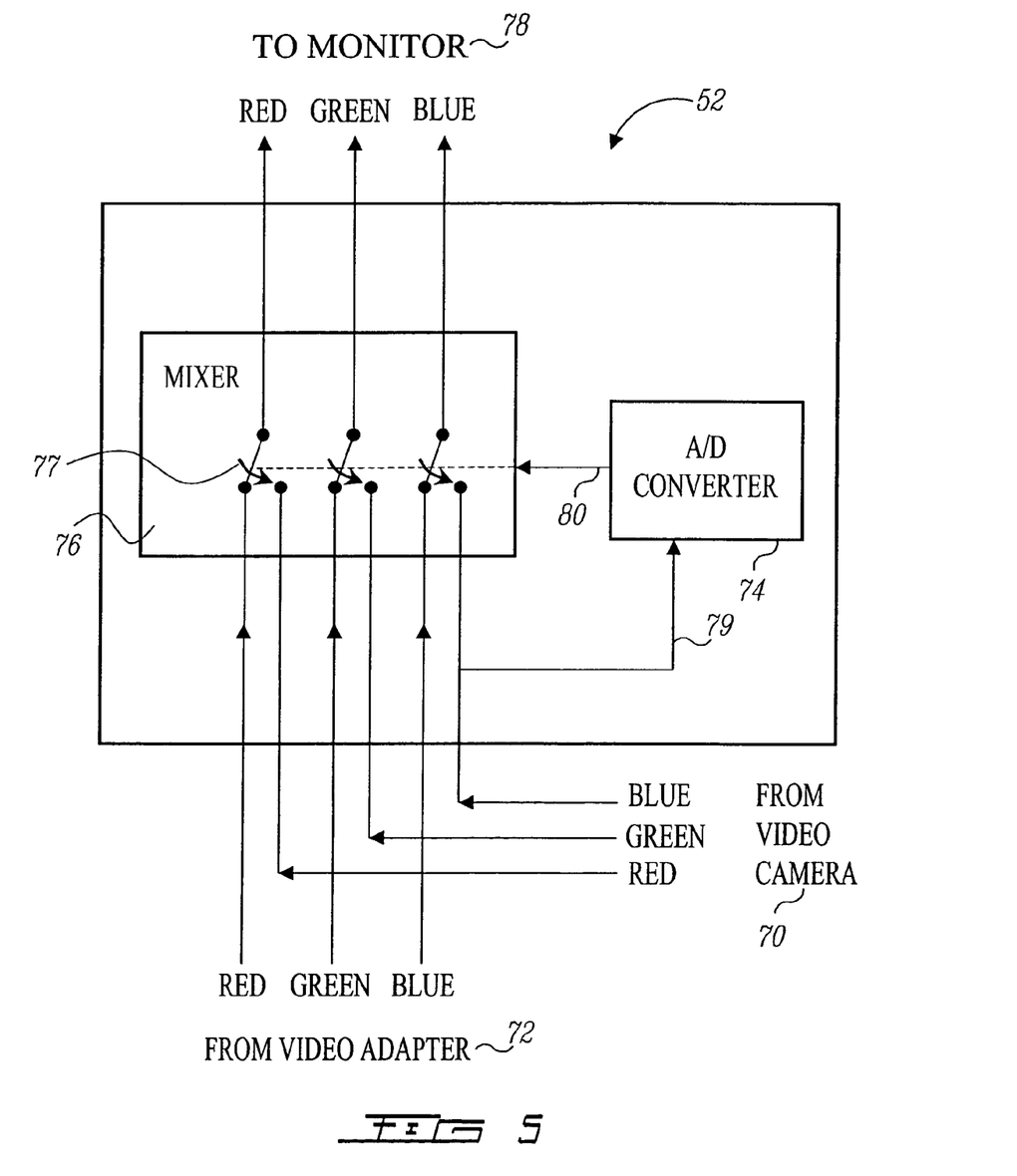
FIG. 5 provides a block diagram of a video mixing circuit in accordance with an illustrative embodiment of the present invention.

Referring now to FIG. 5, the video mixing circuit 52 generally comprises RGB camera inputs 70, RGB graphics inputs 72, an A/D converter 74, a mixer 76 comprising at least one mixer switch 77, and an RGB monitor output 78. As discussed hereinabove with reference to FIGS. 4A to 4D, the RGB data provided by the camera 16 is combined with the RGB data provided by the video adapter 50 using mixer 76. In order to select the video signal to be sent to the display 32, the mixer must be switched between camera and graphic feeds appropriately. To do so, the camera input data 70 is simultaneously sent to the A/D converter 74 through link 79. As the image signal increases from the background level (as illustrated at T1 in FIG. 4A), the switch signal 80 of A/D converter 74 instructs the mixer 76 to switch to the camera signal 70, and that for all three colour feeds. When the camera signal drops back to the background level (as illustrated at T2 in FIG. 4A), the A/D converter signals the mixer 76 to switch back to the graphics signal 72. As a result, the monitor displays both the graphics 44 and an overlaid image 42 of the user's hand and pointing device 36. As mentioned above, by mixing only every odd, even or $n^{th}$ scan line, or again by modulating the mixer switch 77 at a high frequency when the camera signal 70 is above the background level, a semi-transparent image 42 may be provided on the screen 34 to allow the user to see the graphics 44 thereunder.

Figure 6:
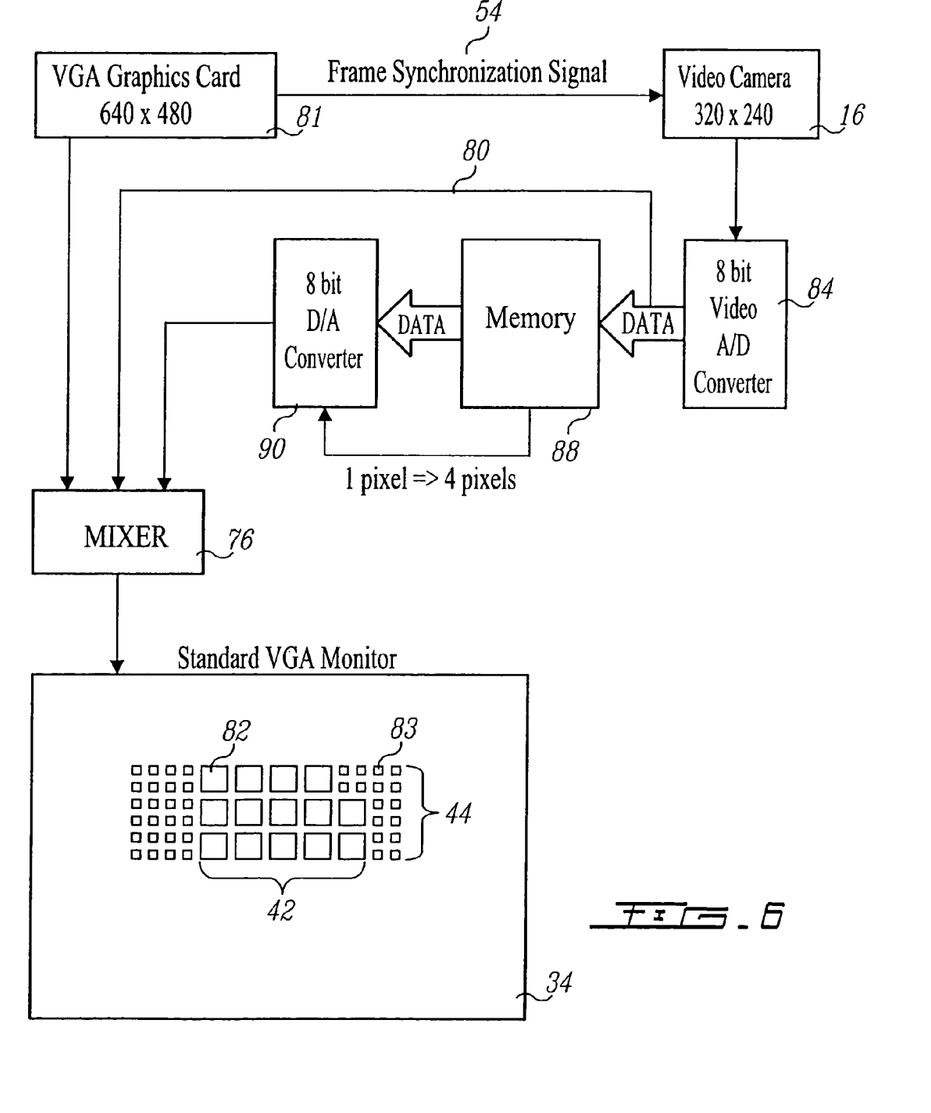
FIG. 6 provides a block diagram of an image combination process in accordance with an illustrative embodiment of the present invention.

Referring now to FIG. 6, the image transfer and processing mechanism may be configured to combine images and graphics of varying resolutions. In the illustrated example of FIG. 6, a low-end video camera 16 coupled to the tablet 12 (not seen in this Figure) provides images 42 with a 320×240 pixel resolution. Comparatively, the VGA Graphics Card 81 provides graphics to the display screen 34 with a 640×480 pixel resolution. Consequently, each imaged pixel 82 must be formatted to overlay 4 (four) respective graphics pixels 83. To do so, the video stream is first fed through an A/D converter 84, which also provides the mixer switch signal 80 to the video mixing circuit 52, for temporary data storage in memory 88. The data is then converted such that every camera pixel 82 is doubled within a given scan line before proceeding through a D/A converter 90 to be combined with a display graphics scan line using the video mixing circuit 52. To provide a full conversion, every camera scan line will be processed twice by the video mixing circuit 52, thereby providing a combined image 42 without reducing the resolution of the display graphics 44.

As it will now be apparent to a person of skill of the art, other methods and mechanisms for transferring the isolated image 42 may be implemented with this system without departing from the general scope and nature of the present disclosure. For example, though a hardware mixer is described herein for isolating and overlaying the image 42 of the user's hand and pointing device 36 on the display graphics 44, other similar hardware mixers may be used to obtain a similar result. Namely, data conversion and resolution matching hardware are not uncommon in the field of image digitization and visualization. Furthermore, various software-based mixers and packages could be used to reproduce the effects generated by the above-described hardware method. Namely, various visualization and mixing software could be implemented to combine the images 42 and graphics 44 on the display screen 34. A software-based mixer could potentially acquire images directly form an A/D converter or frame grabber coupled to the video source, or again directly from a digital video source, and proceed with the image isolation and combination process. Such software-based mixers could also provide various visualization features to the user, namely calibration functions, image distortion features to adjust image size, color and stretch, as well as other image alteration features of the like to improve the visual and workable implementation of the input device 10.

Figure 7A:
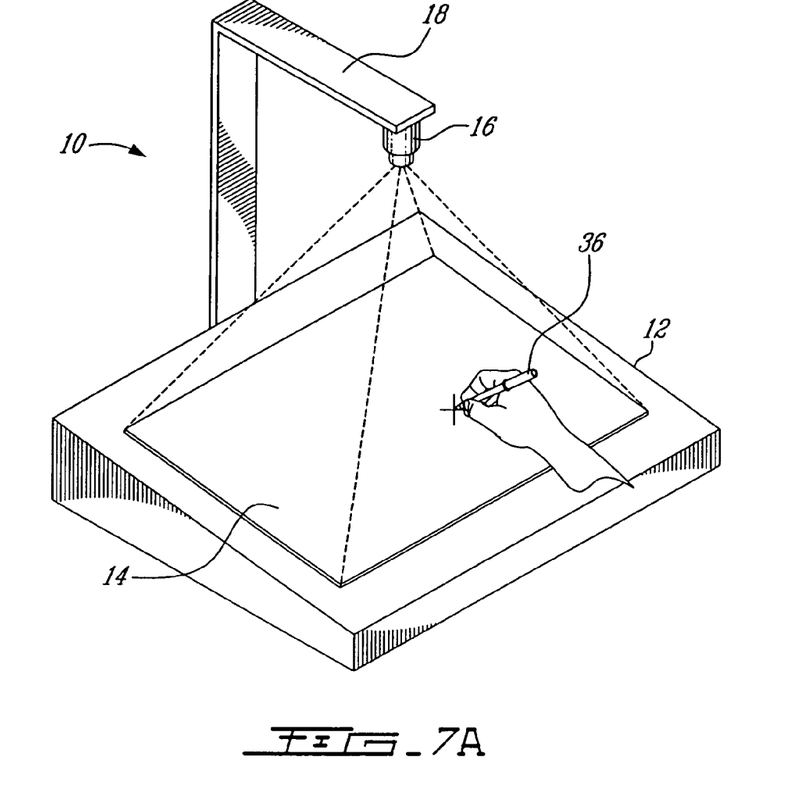
FIGS. 7A, 7B, 8A and 8B provide schematic diagrams of the functions of the camera assisted tablet of FIG. 1A when used as an input device for plural windows on a same display in accordance with an alternative illustrative embodiment of the present invention.
Figure 7B:
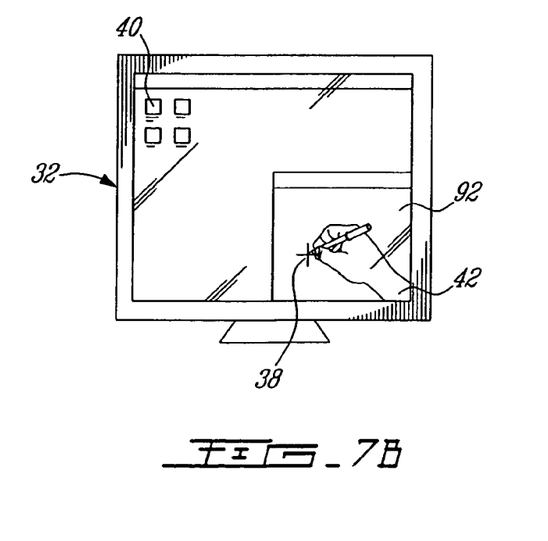
Figure 8A:
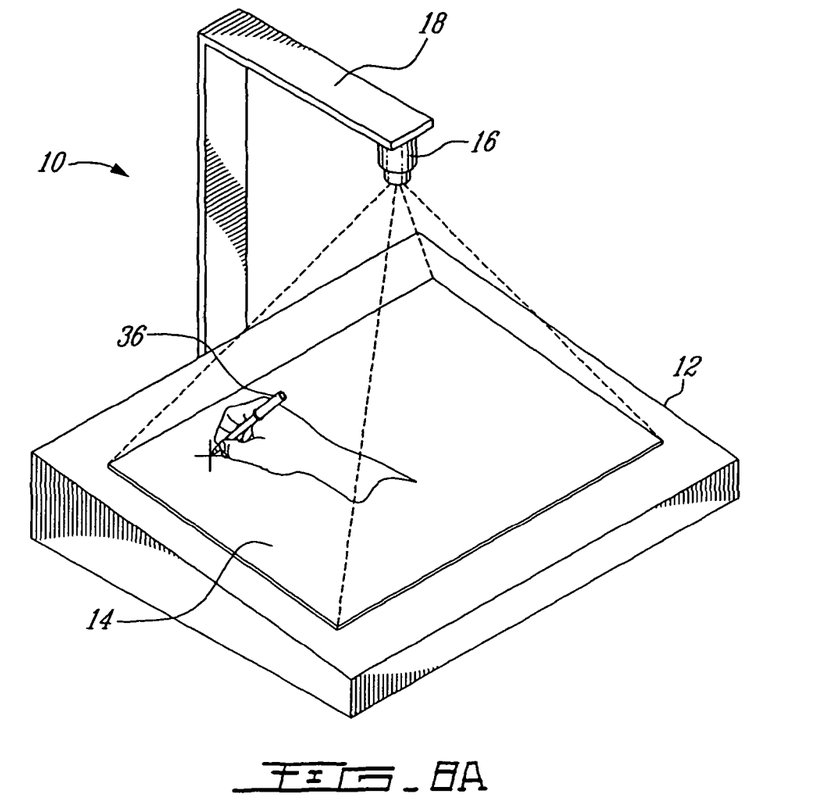
Figure 8B:
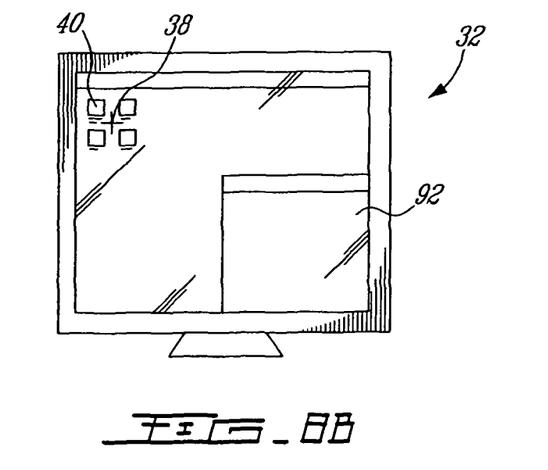

Referring now to FIGS. 7A, 7B, 8A and 8B, the camera assisted tablet 10, in accordance with an alternative illustrative embodiment of the present invention, may also be implemented to provide different visualization effects for different software or programs implemented on the processing system. Namely, the camera assisted tablet 10 may be configured to work differently or exclusively in selected sections or areas of the display screen, such sections hereinafter referred to using the generic terms window and/or frame. For instance, a user may opt to only visualize his/her hand operating the pointing device 36 in a specific program running in a particular window or frame 92 on the display 32 (FIG. 7B), and not to include the captured image 42 when operating other functions 40 on the display 32, such as other programs, icons, menus and the like (FIG. 8B). For example, in FIGS. 7A and 7B, a user is interfacing with a particular window or frame 92 on the display 32 wherein the hand visualization feature is implemented. Consequently, the image 42 of the user's hand and pointing device 36 is combined with the display graphics in the window 92. In FIGS. 8A and 8B, the user is interfacing with features and icons, as in 40, outside window 92. Since the cursor 38 is now outside the window 92, the hand visualization effect is turned off. As the user returns the cursor 38 to the opened window 92, the image 42 will again be presented. In general, a user may prefer to visualize his/her hand articulating the pointing device 36 while writing or drawing in a software designed therefore, as in window or frame 92 of FIG. 7B, and use only the cursor 38 when selecting icons and menus from the background window, as in 40 of FIG. 8B. In this alternative illustrative embodiment, the tablet still provides control of the cursor 38 on the entire display 32, but limits the visualization of the user's hand and pointing device 36 to instances when the cursor 38 is within the selected window or frame 92.

Alternatively, the tablet 12 may be configured to operate solely within the selected window 92, thereby providing control of a window-dependent cursor therein. An additional user input device, such as a standard mouse or keyboard, could be used to operate functions and features outside the selected window 92. The dimensions of such a window 92 could then be selected to be generally proportional to the active surface 14 of the tablet 12, while likely differing in size. As the dimensions of the window 92 are potentially selectively altered, the proportionality between the window 92 and the surface 14 could be dynamically updated such that the user may still use the borders of the surface 14 as reference for cursor control within the window 92.

Conversely, a user may chose to deactivate the visualization effect of the camera assisted tablet within selected windows and frames. For example, a user may select to deactivate the image of his/her hand when operating a writing software wherein the user prefers to use a keyboard as data input as opposed to the pointing device 36. In this example, the visualization effect becomes cumbersome within the selected window, while remaining useful outside the selected window. In one example, the user may operate both a writing software using a keyboard and mouse, and a drawing software using the camera assisted tablet 10, pointing device 36 and hand visualization effect, simultaneously on a same display 32. In this example, the tablet 12 could be configured to control the cursor over the entire display 32, or only within the area covered by the selected window or frame 92.

As will now be apparent to a person of ordinary skill in the art, other similar implementations may be considered without departing from the general scope and nature of the illustrative embodiments. Namely, various display-tablet configurations may be devised to optimize user comfort and proficiency. Furthermore, such implementation and display options may also apply to frames within a window, combinations of plural windows and sub-windows, and other such display techniques. Ultimately, the visualization effect of the camera assisted tablet 10, as well as control of the cursor 38 on the display 32 using the tablet 12, may be configured and selected to function, or be deactivated, within any set or subset of windows and frames presented on the display 32.

Other imaging devices and techniques may also be considered to provide similar visualization effects. In a first such alternative embodiment, the camera 16 is replaced by a laser scanner that scans and transmits a reflected image or a transmitted shadow of the user's hand and pointing device 36 to the processor. Using this technique a real-time image of the user's hand and pointing device 36 for screen graphics overlay is provided without using a specifically photographic imaging device such as a camera 16.

In a second such alternative embodiment, the camera 16 is replaced by a heat sensing device, either within or above the tablet, that provides an image of the heat transferred by the user's hand and pointing device 36. One could also provide a heated pointing device 36 to increase the visibility of the pointing device 36 in the heat-generated image 42 overlaid on the display graphics 44.

In a third such alternative embodiment, the camera 16 is replaced by an infrared imaging device, imaging the user's hand and pointing device 36 either by infrared reflectivity (e.g. an IR emitter and sensor positioned above the tablet 12 in the place of the camera, or an IR emitter and sensor coupled within the tablet 12), or by infrared transmission (e.g. an IR emitter positioned above the tablet 12, and an IR sensor coupled within the tablet 12 for detecting an IR shadow produced by the user's hand and pointing device 36). Such IR imaging techniques also provide real-time images for display graphics overlay. Furthermore, alternative IR techniques could also work using simple IR heat sensors, not unlike the second alternative embodiment described above, wherein an IR heat sensor detects the presence of the user's hand and pointing device 36 (possibly heated) directly within the tablet 12, or again from above.

In a fourth such alternative embodiment, the camera 16 is replaced by a sonar or acoustic imaging device, once again imaging the users hand and pointing device 36, this time using acoustic waves instead of electromagnetic waves as described above with reference to photographic, IR and laser imaging devices.

Necessarily, other such imaging devices could be devised to replace the camera in the illustrative embodiments described herein, as should now become apparent to a person of ordinary skill in the art, without departing from the general scope and nature of the present disclosure. Furthermore, the above and other imaging devices and techniques may be implemented using analog or digital outputs for imaging data. The image transfer, isolation and overlaying techniques and mechanisms may be adapted accordingly to interpret, manipulate and process a plurality of image and graphic data types and formats, both from the imaging device 16 and the video adapter 50 of the processing device 30.

In addition, though the illustrative embodiments of the appended figures present an imaging device configuration substantially normal to the tablet active surface 14, the imaging device 16 may be configured and calibrated to work at an angle thereto. Manual, optical, electronic or software calibrations may be used to configure the input images provided by the imaging device 16 to provide an overlay image 42 concurrent with a user's preferred viewing alignment and orientation. Namely, the overlay image 42 may be distorted, scaled or adapted to better reflect what a user would see if he/she were to be viewing his/her hand writing on a physical piece of paper, or again modified to provide a better look and feel to the user in accordance with screen 34, graphics 44 and image 42 viewing preferences. All image modifications can be implemented electronically through hardware and/or software switches and options.

As mentioned hereinabove, all of the above image isolation, rendering, modification and general processing procedures may also be provided, either collectively or independently, by software installed on and implemented by the processing device 30, a processor integrated into the tablet 12, or again a processor integrated into the display unit 32. Such software could acquire the image data directly from an A/D converter or a frame grabber to isolate the hand and pointing device image from the background image of the tablet. As mentioned above, the software could also configure the overlay image 42 as well as provide alignment functions and parameters to electronically adjust the positioning of the overlay image 42. Once properly aligned, an onscreen cursor 38 may become obsolete, the user actions being guided by the imaged tip 46 of the pointing device 36. Furthermore, the image opacity or transparency may be set to enhance or reduce visibility of the overlay image 42 and the graphics 44 figuratively displayed thereunder.

Finally, though an x-y input device as in 10 may be constructed specifically to provide the visualization enhancements discussed herein, it will now be apparent to a person of ordinary skill in the art that such a system may be constructed of existing components. For example, one could foresee using an existing pen tablet as in 12 coupled to a processing device as in 30 having a display as in 32, providing a standard camera as in 16 positioned to capture images thereof, and supporting the two with a software or hardware package that provides the image transfer mechanism and visual combination effects described herein. Such a system could thus combine the use of any type of x-y input tablet (touch tablets, proximity tablets, pen tablets, etc.), any type of display (CRT, LCD, Plasma, etc.), and any type of camera (digital, analog, CCD, CMOS, etc.) or imaging device, to provide the combined visualization effect described herein to improve a tablet user's comfort and proficiency using the tablet.

It is to be understood that the invention is not limited in its application to the details of construction and parts illustrated in the accompanying drawings and described hereinabove. The invention is capable of other embodiments and of being practised in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention as defined in the appended claims.

What is claimed is:

1. A method for providing visual feedback to a user operating a pointing device on a tablet for controlling a cursor within a window of a display, the user using a physical hand to operate the pointing device, the tablet defining a tablet region corresponding to the window, the tablet region comprising dimensions proportionally the same as the window, said method using an imaging device, said method comprising:
   acquiring with the tablet a pointing device position of the pointing device relative to the tablet region;
   substantially simultaneously to acquiring said pointing device position, capturing with the imaging device a hand image of the physical hand of the user operating the pointing device;
   positioning the cursor in the window using said pointing device position, the cursor being positioned so that the position of the cursor relative to the window corresponds to the pointing device position relative to the tablet region; and
   substantially simultaneously to positioning the cursor in the window, overlaying on the display said hand image in a manner such that the position and orientation of said hand image relative to the cursor and to the window corresponds to the position and orientation of the hand relative to the pointing device position and to the tablet region;
   whereby visual feedback regarding the position, orientation and shape of the physical hand of the user operating the pointing device is provided directly on the display by overlaying on the display the hand image acquired of the physical hand of the user operating the pointing device.

2. The method as in claim 1, wherein the window comprises dimensions substantially the same as the display.

3. The method as in claim 1, wherein the window comprises dimensions less than the display.

4. The method as in claim 1, wherein the window comprises at least one sub-window.

5. The method as in claim 4, wherein said hand image is displayed only when the cursor is within at least one of said at least one sub-window.

6. The method as in claim 1, wherein said step of displaying said hand image comprises a step of mixing said captured image with a second image in the window.

7. The method as in claim 6, wherein said second image comprises a graphical user interface.

8. The method as in claim 6, wherein said step of mixing said hand image with a second image comprises selectively adjusting a translucence of said hand image such that when said captured image overlays a fraction of said second image, said fraction can still be seen through said hand image.

9. The method as in claim 6, wherein said step of mixing said hand image with a second image comprises selectively adjusting said position of said hand image to selectively align a point of said hand image with the cursor.

10. A user input device for providing visual feedback to a user operating a pointing device for controlling a cursor within a window of a display of a data processing system, the user using a physical hand to operate the pointing device, said user input device comprising: a tablet, said tablet defining a tablet region corresponding to the window, said tablet region comprising dimensions proportionally the same as the window, said tablet including an active surface, said active surface providing pointing device position information indicative of the pointing device position relative to said tablet region an imaging device for capturing a hand image of the physical hand of the user operating the pointing device substantially simultaneously to acquiring said pointing device position; and an image processor for positioning the cursor in the window using said pointing device position, the cursor being positioned so that the position of the cursor relative to the window corresponds to the pointing device position relative to the tablet region and, substantially simultaneously to positioning the cursor in the window, overlaying on the display said hand image in a manner such that the position and orientation of said hand image relative to the cursor and to the window corresponds to the position and orientation of the hand relative to the pointing device position and to the tablet region whereby visual feedback regarding the position, orientation and shape of the physical hand of the user operating the pointing device is provided directly on the display by overlaying on the display the hand image acquired of the physical hand of the user operating the pointing device.

11. The user input device as in claim 10, wherein the window comprises dimensions substantially the same as the display.

12. The user input device as in claim 10, wherein the window comprises dimensions less than the display.

13. The user input device as in claim 10, wherein the window comprises at least one sub-window.

14. The user input device as in claim 13, wherein said hand image is displayed only when the cursor is within at least one of said at least one sub-window.

15. The user input device as in claim 10, wherein said image processor comprises an image mixer for combining said hand image with a second image.

16. The user input device as in claim 15, wherein said second image comprises a graphical user interface.

17. The user input device as in claim 15, wherein said image mixer comprises mixing software.

18. The user input device as in claim 17, wherein said mixing software comprises at least one adjustable image mixing parameter.

19. The user input device as in claim 18, wherein said at least one adjustable image mixing parameter comprises a translucence parameter for selectively adjusting a translucence of said hand image.

20. The user input device as in claim 18, wherein said at least one adjustable image mixing parameter comprises an alignment parameter for selectively adjusting said position of said hand image on the display.

21. The user input device as in claim 17, wherein said software is implemented in the data processing system.

22. The user input device as in claim 15, wherein said image mixer comprises mixing hardware.

23. The user input device as in claim 22, wherein said mixing hardware comprises at least one adjustable image mixing switch.

24. The user input device as in claim 10, wherein said at least one adjustable image mixing switch comprises a translucence switch for selectively adjusting a translucence of said hand image.

25. The user input device as in claim 10, wherein said at least one adjustable image mixing switch comprises an alignment switch for selectively adjusting said position of said captured image on the display.

26. The user input device as in claim 10, wherein said hand image is translucent.

27. The user input device as in claim 10, wherein said hand image is opaque.

28. The user input device as in claim 10, wherein said imaging device is an optical device.

29. The user input device as in claim 28, wherein said optical device is a camera.

30. The user input device as in claim 10 wherein acquiring said hand image includes capturing a captured image of said tablet and of the physical hand positioned over said tablet; and extracting from the captured image the portion of the captured image corresponding to the physical hand while preserving shape, position and orientation of the physical hand of the user.

31. The user input device as in claim 10, wherein said display and said tablet have spatial orientations that differ from each other.

32. The user input device as in claim 10, wherein said imaging device is a heat sensing device.

33. The user input device as in claim 10, wherein said imaging device is a sonar device.

34. The user input device as in claim 10, wherein said imaging device is a loser scanning device.

35. The user input device as in claim 10, wherein said imaging device is an IR imaging device.

36. The user input device as in claim 10, wherein said imaging device is positioned above said tablet region.

37. The user input device as in claim 36, wherein a position of said imaging device is substantially centered above said tablet region.

38. The user input device as in claim 36, wherein an optical axis of said imaging device is substantially normal to said tablet.

39. The user input device as in claim 10, wherein said pointing device is a pen-like object.

40. The user input device as in claim 10, wherein said pointing device is a stylus.

41. The user input device as in claim 10, wherein said pointing device is a mouse.

42. The user input device as in claim 10, wherein said pointing device is a user finger.

43. A method as defined in claim 1, wherein acquiring said hand image includes
    capturing a captured image of the tablet and of the physical hand positioned over the tablet; and
    extracting from the captured image the portion of the captured image corresponding to the physical hand while preserving shape, position and orientation of the physical hand of the user.

44. A method as defined in claim 1, further comprising: providing the tablet and the display with the display and the tablet having spatial orientations that differ from each other.

* * * * *